United States Patent [19]

Nishida et al.

[11] Patent Number: 4,555,494

[45] Date of Patent: Nov. 26, 1985

[54] DIELECTRIC CERAMIC COMPOSITIONS

[75] Inventors: Masamitsu Nishida, Osaka; Hiromu Ouchi, Toyonaka; Yoshihiro Matsuo, Neyagawa, all of Japan

[73] Assignee: Matsushita Electric Industrial Co., Ltd., Kadoma, Japan

[21] Appl. No.: 532,911

[22] Filed: Sep. 16, 1983

[30] Foreign Application Priority Data

| Sep. 17, 1982 [JP] | Japan | 57-162535 |
| Sep. 17, 1982 [JP] | Japan | 57-162536 |
| Dec. 16, 1982 [JP] | Japan | 57-221403 |

[51] Int. Cl.⁴ .............................................. C04B 35/00
[52] U.S. Cl. ..................................... 501/134; 501/135
[58] Field of Search ................................. 501/134, 135

[56] References Cited

U.S. PATENT DOCUMENTS

| 3,663,251 | 5/1972 | Moren et al. | 106/90 |
| 4,078,938 | 3/1978 | Yonezawa et al. | 501/134 |
| 4,236,928 | 12/1980 | Yonezawa et al. | 501/134 |
| 4,339,544 | 7/1982 | Sakabe et al. | 501/134 |
| 4,379,319 | 4/1983 | Wilson | 501/134 |

FOREIGN PATENT DOCUMENTS

| 2050084 | 4/1972 | Fed. Rep. of Germany | 106/314 |
| 53-19600 | 2/1978 | Japan | 501/134 |

Primary Examiner—Helen M. McCarthy
Attorney, Agent, or Firm—Cushman, Darby & Cushman

[57] ABSTRACT

A dielectric ceramic composition consisting essentially of:

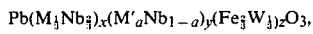

$$Pb(M_{\frac{1}{3}}Nb_{\frac{2}{3}})_x(M'_aNb_{1-a})_y(Fe_{\frac{2}{3}}W_{\frac{1}{3}})_zO_3,$$

wherein M represents Ni or Mg and $x+y+z=1$, and when M is Ni, $M'=Fe$, $a=\frac{1}{2}$, $0.01 \leq x \leq 0.40$, $0.45 \leq y \leq 0.80$ and $0.05 \leq z \leq 0.50$; and when M is Mg, $M'=Zn$, $a=\frac{1}{3}$, $0.01 \leq x \leq 0.70$, $0.15 \leq y \leq 0.45$ and $0.05 \leq z \leq 0.60$.

The ceramic composition allows low-temperature sintering and exhibits high dielectric constant.

1 Claim, No Drawings

DIELECTRIC CERAMIC COMPOSITIONS

BACKGROUND OF THE INVENTION

1. Field of the Invention:

The present invention relates to dielectric ceramic compositions allowing low-temperature sintering, and exhibiting high dielectric constant, and being suitable for use in multilayer ceramic capacitors.

2. Description of the Prior Art:

As promising ceramic compositions for this application, ceramic compositions essentially consisting of $BaTiO_3$ have been widely used as a materials of high dielectric constant. However, the $BaTiO_3$ system ceramics must be sintered at a very high temperature in the range of 1300° C. to 1400° C., so that where they are used as a dielectric material of multilayer ceramic capacitors, expensive metals such as platinum or palladium which can stand such high sintering temperature should be used as internal electrodes of the capacitors. Therefore there has still been a demand for dielectric ceramic materials which can be sintered at a temperature as low as below 1000° C. for enabling the use of relatively cheap metal such as silver for the internal electrodes.

U.S. Pat. No. 4,078,938 has described binary system ceramic compositions of $PbFe_{\frac{2}{3}}W_{\frac{1}{3}}O_3$—$PbFe_{1/78}Nb_{\frac{1}{2}}O_3$ which can be sintered at a relatively low temperature, and which exhibit high dielectric constant. However, the ceramics have low specific resistance.

U.S. Pat. No. 4,236,928 has described binary system ceramic compositions of $Pb(Fe_{\frac{2}{3}}W_{\frac{1}{3}})O_3$—$Pb(Zn_{\frac{1}{3}}Nb_{\frac{2}{3}})O_3$ which can be sintered at a temperature below 1000° C. However, the ceramics have relatively low dielectric constant.

SUMMARY OF THE INVENTION

It is one object of the present invention to provide excellent dielectric ceramic compositions which have low sintering temperature, high dielectric constant and high specific resistivity.

Another object of the present invention is to provide dielectric ceramic compositions which have low sintering temperature along with high dielectric constant and low temperature coefficient of the dielectric constant.

In accomplishing these objects, a ceramic composition of the present invention has a dielectric ceramic composition consisting essentially of a material represented by the formula

wherein

M represents one element selected from the group consisting of Ni and Mg, $M'=Fe$, $a=\frac{1}{2}$, $0.01 \leq x \leq 0.40$, $0.45 \leq y \leq 0.80$ and $0.05 \leq z \leq 0.50$ when Ni is selected for M, $M'=Zn$, $a=\frac{1}{3}$, $0.01 \leq x \leq 0.70$, $0.15 \leq y \leq 0.45$ and $0.05 \leq z \leq 0.60$ when Mg is selected for M, and $x+y+z=1$.

These novel compositions of the present invention can be sintered at a temperature as low as 1000° C. or less, and have a high dielectric constant, a high specific resistivity and a low temperature coefficient of the dielectric constant.

DETAILED DESCRIPTION OF THE INVENTION

The present invention is based on the discovery that within certain particular compositional ranges of these systems $Pb(Ni_{\frac{1}{3}}Nb_{\frac{2}{3}})O_3$—$Pb(Fe_{\frac{1}{2}}Nb_{\frac{1}{2}})O_3$—$Pb(Fe_{\frac{2}{3}}W_{\frac{1}{3}})O_3$ and $Pb(Mg_{\frac{1}{3}}Nb_{\frac{2}{3}})O_3$—$Pb(Zn_{\frac{1}{3}}Nb_{\frac{2}{3}})O_3$—$Pb(Fe_{\frac{2}{3}}W_{\frac{1}{3}})O_3$ the specimens exhibit very high dielectric constant along with low sintering temperature.

The compositions described herein may be prepared in accordance with various well-known ceramic procedures.

EXAMPLE 1

The starting materials, viz., lead oxide (PbO), nickel oxide (NiO), ferric oxide ($Fe_2O_3$), niobium oxide ($Nb_2O_5$) and tungsten oxide ($WO_3$), all of relatively pure grade, were intimately mixed in a ball mill with distilled water. Thereafter the mixtures were dried and then calcined at 750° C. for 2 hours. Thus obtained materials were wet-ground in a ball mill, dried, mixed with polyvinyl alcohol as a binder solution, and then pressed into columns of about 13 mm in diameter and about 8 mm in length at a pressure of 700 kg/cm². After burning out binder at about 700° C., the pressed columns which were put into magnesia crucible were sintered at a temperature of 880° C. to 1040° C. for 2 hours. The sintered bodies were cut into discs of about 1 mm in thickness, and then were attached Cr—Au electrodes on the both surfaces of the discs by a method of vacuum evaporation. Various properties of the ceramic discs thus obtained are shown in Table 1. The dielectric constant ($\epsilon_r$) and the dielectric loss (D) were measured at a frequency of 1 kHz and a voltage of 1 V under room temperature. The temperature coefficient of a dielectric constant was obtained by measuring a dielectric constant at a temperature range of −25° C. to 85° C. and calculated with reference to the dielectric constant at 20° C. The specific electrical resistivity was measured at room temperature by applying a D.C. voltage of 1 kV.

TABLE 1

| No. | Compositions x | y | z | Sintering temperature (°C.) | $\epsilon_r$ | D (×10⁻⁴) | Change of $\epsilon_r$ (%) −25° C. | 85° C. | Specific resistivity (Ω·cm) |
|---|---|---|---|---|---|---|---|---|---|
| 1* | 0 | 0.50 | 0.50 | 940 | 8740 | 41 | 72 | −75 | 1.5 × 10⁷ |
| 2 | 0.01 | 0.59 | 0.40 | 920 | 18690 | 245 | −74 | −69 | 6.1 × 10⁸ |
| 3* | 0.05 | 0.85 | 0.10 | 920 | 6130 | 576 | −62 | 44 | 1.6 × 10⁹ |
| 4 | 0.05 | 0.45 | 0.50 | 900 | 8570 | 80 | 36 | −59 | 2.3 × 10⁹ |
| 5* | 0.05 | 0.40 | 0.55 | 880 | 5710 | 72 | 55 | −53 | 7.5 × 10⁸ |
| 6 | 0.10 | 0.80 | 0.10 | 900 | 8260 | 483 | −58 | 27 | 3.2 × 10¹¹ |
| 7 | 0.10 | 0.60 | 0.30 | 880 | 22620 | 260 | −68 | −76 | 7.1 × 10¹¹ |
| 8 | 0.10 | 0.50 | 0.40 | 900 | 13450 | 67 | −15 | −71 | 6.5 × 10¹¹ |
| 9 | 0.20 | 0.60 | 0.20 | 940 | 23410 | 136 | −71 | −75 | 5.0 × 10¹¹ |
| 10 | 0.30 | 0.60 | 0.10 | 960 | 15950 | 293 | −43 | −60 | 4.3 × 10¹¹ |
| 11 | 0.30 | 0.50 | 0.20 | 960 | 11290 | 442 | −27 | −53 | 8.9 × 10¹⁰ |

TABLE 1-continued

| No. | Compositions | | | Sintering temperature (°C.) | $\epsilon_r$ | D ($\times 10^{-4}$) | Change of $\epsilon_r$(%) | | Specific resistivity ($\Omega$-cm) |
|---|---|---|---|---|---|---|---|---|---|
| | x | y | z | | | | $-25°$ C. | $85°$ C. | |
| 12 | 0.40 | 0.55 | 0.05 | 980 | 8230 | 124 | 16 | $-47$ | $1.7 \times 10^{11}$ |
| 13* | 0.45 | 0.55 | 0 | 1020 | 7400 | 526 | $-56$ | $-29$ | $5.2 \times 10^{10}$ |
| 14* | 0.50 | 0.40 | 0.10 | 1040 | 4280 | 232 | 32 | $-64$ | $7.4 \times 10^{10}$ |

Compositions of the Nos. with an asterisk are outside the scope of the present invention.
Compositions: $Pb(Ni_{\frac{1}{3}}Nb_{\frac{2}{3}})_x(Fe_{\frac{1}{2}}Nb_{\frac{1}{2}})_y(Fe_{\frac{2}{3}}W_{\frac{1}{3}})_zO_3$.

From Table 1 it is obvious that ceramic compositions Nos. 2, 4, and 6 to 12 within the scope of the present invention provide high dielectric constant ($\epsilon_r = 8230-23410$) and low dielectric loss ($D < 500 \times 10^{-4}$), and can be sintered at a temperature below 1000° C., and further provide high specific resistivity and low temperature coefficient of dielectric constant.

In the ceramic compositions represented by the formula $Pb(Ni_{\frac{1}{3}}Nb_{\frac{2}{3}})_x(Fe_{\frac{1}{2}}Nb_{\frac{1}{2}})_y(Fe_{\frac{2}{3}}W_{\frac{1}{3}})_zO_3$ wherein $x < 0.01$, the specific resistivity of the ceramics is low. In the compositions of $x > 0.40$, the ceramics cannot be sintered at a temperature below 1000° C. And the ceramic compositions of $y < 0.45$, $y > 0.80$, $z < 0.05$ and/or $z > 0.50$ provide relatively small dielectric constant. Therefore such compositions are not suited for use as a capacitors.

EXAMPLE 2

The starting materials, viz., lead oxide (PbO), nickel oxide (NiO), ferric oxide ($Fe_2O_3$), niobium oxide ($Nb_2O_5$), tungsten oxide ($WO_3$), manganese dioxide ($MnO_2$), cromium oxide ($Cr_2O_3$), cobalt oxide (CoO) and lithium carbonate ($Li_2CO_3$), all of relatively pure grade, were intimately mixed in a ball mill with distilled water. Thereafter the mixtures were dried and then calcined at 750° C. for 2 hours. Thus obtained materials were wet-ground in a ball mill, dried, mixed with polyvinyl alcohol as a binder solution, and then pressed into columns of about 13 mm in diameter and about 8 mm in length at a pressure of 700 kg/cm². After burning out binder at about 700° C., the pressed columns which were put into magnesia crucible were sintered at a temperature of 840° to 980° C. for 2 hours. The sintered bodies were cut into discs of about 1 mm in thickness, and then were attached Cr—Au electrodes on the both surfaces of the discs by a method of vacuum evaporation. $\epsilon_r$, D and specific electrical resistivity of the ceramic discs are shown in Table 2. $\epsilon_r$ and D were measured at a frequency of 1 kHz and a voltage of 1 V under room temperature. The specific resistivity was measured at room temperature by applying a D.C. voltage of 1 kV.

TABLE 2

| No. | Compositions | | | | Sintering temperature (°C.) | $\epsilon_r$ | D ($\times 10^{-4}$) | Specific resistivity ($\Omega$-cm) |
|---|---|---|---|---|---|---|---|---|
| | x | y | z | Additives (wt %) | | | | |
| 15 | 0.01 | 0.59 | 0.40 | — | 920 | 18690 | 245 | $6.1 \times 10^8$ |
| 16 | " | " | " | 0.2 $MnO_2$ | 920 | 17920 | 153 | $7.5 \times 10^{10}$ |
| 17 | " | " | " | 0.2 $Cr_2O_3$ | 920 | 16870 | 107 | $4.1 \times 10^{10}$ |
| 18 | " | " | " | 0.2 CoO | 920 | 18150 | 124 | $3.9 \times 10^{10}$ |
| 19 | " | " | " | 0.2 $Li_2O$ | 920 | 19430 | 82 | $5.4 \times 10^{10}$ |
| 20 | 0.05 | 0.45 | 0.50 | — | 900 | 8570 | 80 | $2.3 \times 10^9$ |
| 21 | " | " | " | 0.01 $MnO_2$ | 900 | 8810 | 72 | $4.3 \times 10^9$ |
| 22 | " | " | " | 0.01 $Cr_2O_3$ | 900 | 8490 | 65 | $4.1 \times 10^9$ |
| 23 | " | " | " | 0.01 CoO | 900 | 8530 | 68 | $5.7 \times 10^9$ |
| 24 | " | " | " | 0.01 $Li_2O$ | 900 | 9070 | 52 | $3.3 \times 10^9$ |
| 25 | 0.10 | 0.80 | 0.10 | — | 900 | 8260 | 483 | $3.2 \times 10^{11}$ |
| 26 | " | " | " | 0.1 $MnO_2$ | 900 | 8200 | 195 | $6.1 \times 10^{11}$ |
| 27 | " | " | " | 0.1 $Cr_2O_3$ | 900 | 8440 | 241 | $8.3 \times 10^{11}$ |
| 28 | " | " | " | 0.1 CoO | 900 | 8610 | 307 | $5.0 \times 10^{11}$ |
| 29 | " | " | " | 0.1 $Li_2O$ | 900 | 8150 | 239 | $9.4 \times 10^{11}$ |
| 30 | 0.10 | 0.60 | 0.30 | — | 880 | 22620 | 260 | $7.1 \times 10^{11}$ |
| 31 | " | " | " | 0.5 $MnO_2$ | 880 | 20590 | 207 | $2.5 \times 10^{12}$ |
| 32 | " | " | " | 1.5 $MnO_2$ | 840 | 16200 | 98 | $2.1 \times 10^{12}$ |
| 33 | " | " | " | 0.2 $MnO_2$ + 0.2 CoO | 900 | 21730 | 134 | $4.8 \times 10^{12}$ |
| 34 | " | " | " | 0.5 $Li_2O$ | 900 | 24100 | 123 | $9.8 \times 10^{12}$ |
| 35 | " | " | " | 1.5 $Li_2O$ | 900 | 17350 | 214 | $1.3 \times 10^{12}$ |
| 36 | " | " | " | 0.2 $MnO_2$ + $Li_2O$ | 880 | 23470 | 72 | $8.3 \times 10^{12}$ |
| 37 | 0.20 | 0.60 | 0.20 | — | 940 | 23410 | 136 | $5.0 \times 10^{11}$ |
| 38 | " | " | " | 0.05 CoO | 940 | 22160 | 108 | $7.2 \times 10^{11}$ |
| 39 | " | " | " | 0.2 CoO | 920 | 21500 | 96 | $4.3 \times 10^{12}$ |
| 40 | " | " | " | 1.5 CoO | 920 | 14020 | 115 | $8.1 \times 10^{11}$ |
| 41* | " | " | " | 2.0 CoO | 920 | 9380 | 324 | $2.3 \times 10^{11}$ |
| 42 | " | " | " | 0.2 $Cr_2O_3$ | 940 | 24340 | 123 | $7.5 \times 10^{12}$ |
| 43 | " | " | " | 1.5 $Cr_2O_3$ | 940 | 16600 | 101 | $5.9 \times 10^{11}$ |
| 44* | " | " | " | 2.0 $Cr_2O_3$ | 940 | 10130 | 157 | $9.4 \times 10^{10}$ |
| 45 | " | " | " | 0.2 CoO + 0.2 $Cr_2O_3$ | 940 | 21940 | 89 | $5.3 \times 10^{12}$ |
| 46 | " | " | " | 0.2 CoO + 0.1 $Li_2O$ | 900 | 18350 | 108 | $7.4 \times 10^{12}$ |
| 47 | " | " | " | 0.2 $Cr_2O_3$ + 0.1 $Li_2O$ | 900 | 19610 | 84 | $6.4 \times 10^{12}$ |
| 48 | " | " | " | 0.1 $MnO_2$ + 0.1 CoO + 0.1 $Cr_2O_3$ | 900 | 21090 | 98 | $5.7 \times 10^{12}$ |
| 49 | " | " | " | 0.1 $MnO_2$ + 0.1 CoO + 0.1 $Cr_2O_3$ + 0.1 $Li_2O$ | 880 | 18720 | 110 | $2.0 \times 10^{12}$ |

TABLE 2-continued

| No. | Compositions | | | Additives (wt %) | Sintering temperature (°C.) | $\epsilon_r$ | D ($\times 10^{-4}$) | Specific resistivity ($\Omega$ - cm) |
|---|---|---|---|---|---|---|---|---|
| | x | y | z | | | | | |
| 50 | 0.30 | 0.60 | 0.10 | — | 960 | 15950 | 293 | $4.3 \times 10^{11}$ |
| 51 | " | " | " | 0.2 $MnO_2$ | 960 | 13490 | 218 | $8.0 \times 10^{12}$ |
| 52* | " | " | " | 2.0 $MnO_2$ | 920 | 7410 | 472 | $2.1 \times 10^{11}$ |
| 53 | " | " | " | 0.2 $Li_2O$ | 940 | 17020 | 240 | $5.2 \times 10^{12}$ |
| 54* | " | " | " | 2.0 $Li_2O$ | 880 | 6740 | 325 | $6.4 \times 10^{10}$ |
| 55 | 0.30 | 0.50 | 0.20 | — | 960 | 11290 | 442 | $8.9 \times 10^{10}$ |
| 56 | " | " | " | 0.1 $MnO_2$ | 960 | 12030 | 279 | $2.7 \times 10^{11}$ |
| 57 | " | " | " | 0.1 $MnO_2$ + 0.1 $Cr_2O_3$ | 960 | 10170 | 194 | $1.3 \times 10^{12}$ |
| 58 | " | " | " | 0.1 $MnO_2$ + 0.1 $Cr_2O_3$ + 0.1 $Li_2O$ | 920 | 11400 | 213 | $2.8 \times 10^{12}$ |
| 59 | 0.40 | 0.55 | 0.05 | — | 980 | 8230 | 124 | $1.7 \times 10^{11}$ |
| 60 | " | " | " | 0.1 $MnO_2$ | 980 | 8610 | 62 | $2.9 \times 10^{12}$ |
| 61 | " | " | " | 0.1 $Cr_2O_3$ | 980 | 8500 | 49 | $5.6 \times 10^{11}$ |
| 62 | " | " | " | 0.1 CoO | 980 | 8140 | 70 | $3.1 \times 10^{12}$ |
| 63 | " | " | " | 0.1 $Li_2O$ | 980 | 8160 | 72 | $4.5 \times 10^{11}$ |

Basic compositions: $Pb(Ni_{\frac{1}{3}}Nb_{\frac{2}{3}})_x(Fe_{\frac{1}{2}}Nb_{\frac{1}{2}})_y(Fe_{\frac{2}{3}}W_{\frac{1}{3}})_zO_3$.
Compositions of the Nos. with an asterisk are outside the scope of the present invention.

It is obvious from Table 2 that $Pb(Ni_{\frac{1}{3}}Nb_{\frac{2}{3}})_x(Fe_{\frac{1}{2}}Nb_{\frac{1}{2}})_y(Fe_{\frac{2}{3}}W_{\frac{1}{3}})_zO_3$ ceramics containing at least one element selected from the group consisting of Mn, Cr, Co and Li in a total quantity equivalent to from 0.01 to 1.5 weight percent of respective oxides ($MnO_2$, $Cr_2O_3$, CoO and $Li_2O$) exhibit high specific electrical resistivity as compared with that of compositions with no addition, exhibit low D as compared with that of the ceramics with no addition, and exhibit still high $\epsilon_r$ (8140-24100) along with low sintering temperature (840°-980° C.). In the compositions containing over 1.5 wt. % of $MnO_2$, $Cr_2O_3$, CoO or $Li_2O$ as additive the specific electrical resistivity of the ceramics is low.

EXAMPLE 3

The starting materials, viz., lead oxide (PbO), magnesium oxide (MgO), zinc oxide (ZnO), ferric oxide ($Fe_2O_3$), niobium oxide ($Nb_2O_5$) and tungsten oxide ($WO_3$), all of relatively pure grade, were intimately mixed in a ball mill with distrilled water. Thereafter the mixture were dried and then calcined at about 750° C. for 2 hours. Thus obtained materials were wet-ground in a ball mill, dried, mixed with polyvinyl alcohol as a binder solution, and then pressed into columns of about 13 mm in diameter and about 8 mm in length at a pressure of 700 kg/cm². After burning out binder at about 700° C., the pressed columns which were put into magnesia crucible were sintered at a temperature of 780° to 1040° C. for 2 hours. The sintered bodies were cut into discs of about 1 mm in thickness, and then were attached Cr—Au electrodes on the both surfaces of the discs by a method of vacuum evaporation. $\epsilon_r$, D and change of $\epsilon_r$ with temperature of the ceramic discs are shown in Table 3. $\epsilon_r$ and D were measured at a frequency of 1 kHz and a voltage of 1 V under room temperature. The change of $\epsilon_r$ with temperature were measured at a temperature range of −25 to 85° C. and calculated with reference to the $\epsilon_r$ at 20° C.

TABLE 3

| No. | Compositions | | | Sintering temperature (°C.) | $\epsilon_r$ | D ($\times 10^{-4}$) | Change of $\epsilon_r$ (%) | |
|---|---|---|---|---|---|---|---|---|
| | x | y | z | | | | −25° C. | 85° C. |
| 64* | — | 0.40 | 0.60 | 920 | 5830 | 95 | 28 | −43 |
| 65 | 0.01 | 0.40 | 0.59 | 900 | 6650 | 108 | 26 | −39 |
| 66* | 0.10 | 0.50 | 0.40 | 860 | 5240 | 281 | −33 | −25 |
| 67 | 0.10 | 0.45 | 0.45 | 820 | 6490 | 235 | −8 | −28 |
| 68 | 0.10 | 0.40 | 0.50 | 780 | 8120 | 223 | 16 | −35 |
| 69 | 0.10 | 0.30 | 0.60 | 820 | 6380 | 67 | 27 | −38 |
| 70* | 0.10 | 0.25 | 0.65 | 840 | 4900 | 85 | 36 | −52 |
| 71 | 0.20 | 0.40 | 0.40 | 820 | 8210 | 98 | −9 | −34 |
| 72 | 0.20 | 0.30 | 0.50 | 800 | 7300 | 57 | 22 | −37 |
| 73 | 0.30 | 0.40 | 0.30 | 840 | 9670 | 112 | −31 | −34 |
| 74 | 0.40 | 0.40 | 0.20 | 820 | 11820 | 203 | −33 | −35 |
| 75 | 0.40 | 0.30 | 0.30 | 820 | 10530 | 64 | −21 | −40 |
| 76 | 0.40 | 0.15 | 0.45 | 860 | 6440 | 71 | 28 | −35 |
| 77 | 0.50 | 0.30 | 0.20 | 900 | 8790 | 135 | −16 | −30 |
| 78 | 0.60 | 0.30 | 0.10 | 940 | 8980 | 183 | −29 | −31 |
| 79 | 0.70 | 0.25 | 0.05 | 960 | 8210 | 236 | −34 | 12 |
| 80 | 0.70 | 0.15 | 0.15 | 940 | 6550 | 124 | −15 | −32 |
| 81* | 0.70 | 0.10 | 0.20 | 1000 | 5670 | 98 | 9 | −46 |
| 82* | 0.73 | 0.25 | 0.02 | 1040 | 8420 | 269 | −47 | 7 |

Compositions of the Nos. with an asterisk are outside the scope of the present invention.
Compositions: $Pb(Mg_{\frac{1}{3}}Nb_{\frac{2}{3}})_x(Zn_{\frac{1}{3}}Nb_{\frac{2}{3}})_y(Fe_{\frac{2}{3}}W_{\frac{1}{3}})_zO_3$.

It is clear from Table 3 that ceramic compositions Nos. 65, 67, 68 and 71 to 80 within the scope of present invention provide high $\epsilon_r$ (6380-11820), low D ($\leq 236 \times 10^{-4}$) and low temperature coefficient of $\epsilon_r$ along with low sintering temperature (780°-960° C.).

The ceramic compositions represented by the formula $Pb(Mg_{\frac{1}{3}}Nb_{\frac{2}{3}})_x(Zn_{\frac{1}{3}}Nb_{\frac{2}{3}})_y(Fe_{\frac{2}{3}}W_{\frac{1}{3}})_zO_3$ wherein $x<0.01$, $y<0.15$, $y>0.45$ and/or $z>0.60$, provide relatively small $\epsilon_r$. In the compositions of $x>0.70$ and/or $z < 0.05$, the ceramics cannot be sintered at a temperature below 1000° C.

As apparent from these Examples 1 to 3, the ternary ceramic compositions of the present invention have low sintering temperature below 1000° C., so that relatively cheap metal such as silver can be employed as internal electrodes of multilayer ceramic capacitors, and the durability of furnace materials for sintering use may be extended and electric power for sintering may be lowered. Moreover, the ceramic compositions according to the present invention exhibit high dielectric constant along with high specific electrical resistivity, low temperature coefficient of the dielectric constant and/or low dielectric loss. Therefore, the ceramic compositions are suitable for use of ceramic capacitors.

It will be evident that the starting materials to be used in the present invention are not limited to those used in the above examples. Other oxide or compounds which are easily decomposed at elevated temperature may be used in place of the starting materials of the above examples.

What is claimed is:

1. A ceramic composition having a dielectric constant of 6380 or higher, and a sintering temperature of 960° C. or lower and consisting essentially of $$Pb(Mg_{\frac{1}{3}}Nb_{\frac{2}{3}})_x(Zn_{\frac{1}{3}}Nb_{\frac{2}{3}})_y(Fe_{\frac{2}{3}}W_{\frac{1}{3}})_zO_3$$

wherein $0.01 \leq x \leq 0.70$, $0.15 \leq y \leq 0.45$, $0.05 \leq z \leq 0.60$ and $x + y + z = 1$.

* * * * *